June 30, 1970  A. J. FRITZ ET AL  3,517,867

DETACHABLE BASKET

Filed March 26, 1968  2 Sheets-Sheet 1

Inventors:
Albert J. Fritz
Rudolph G. Blaho
By: Davis, Lucas, Brewer & Brugman
Attys.

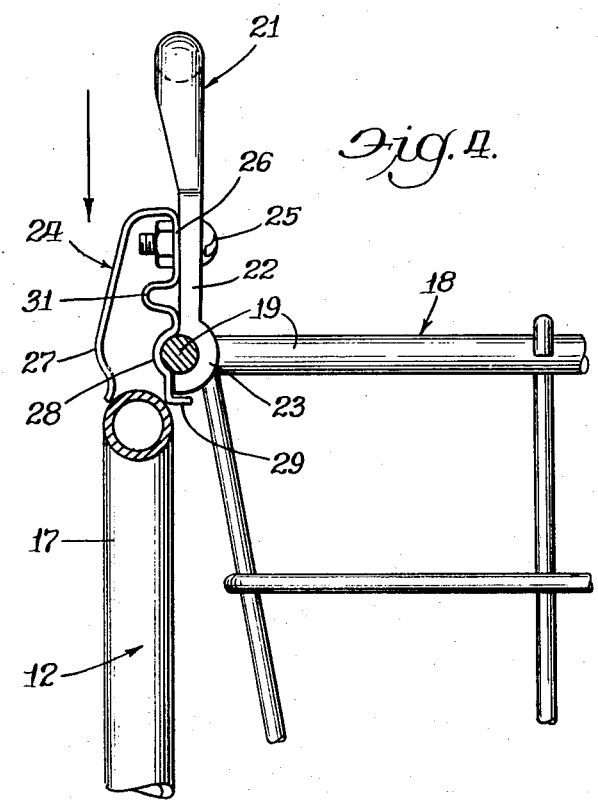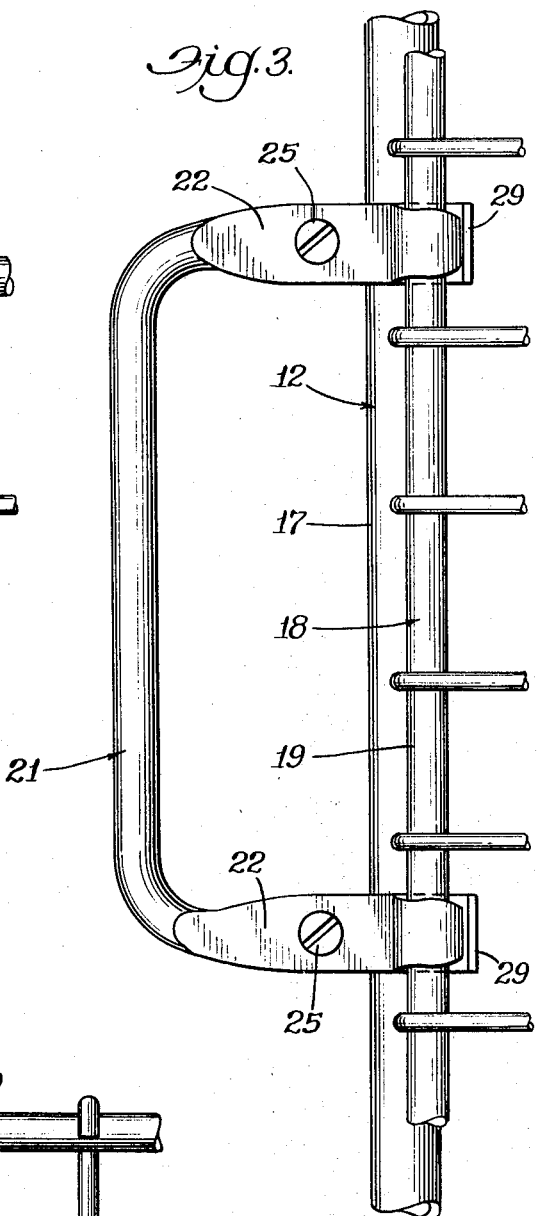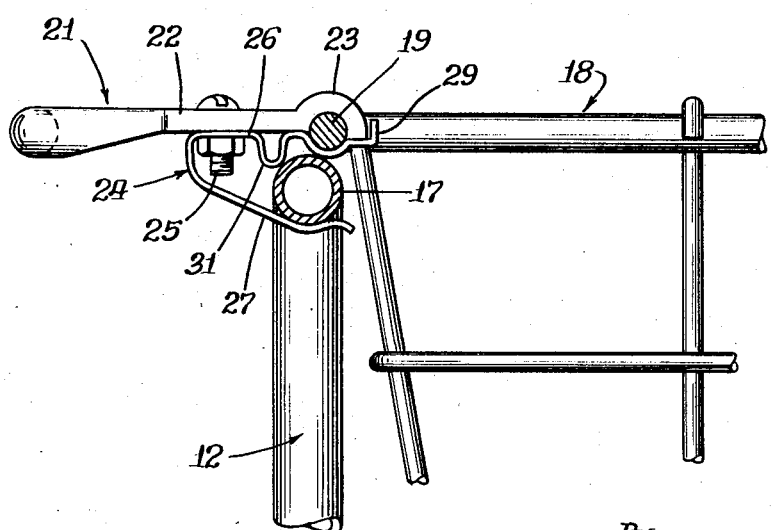

United States Patent Office 3,517,867
Patented June 30, 1970

3,517,867
DETACHABLE BASKET
Albert J. Fritz, Wilmette, and Rudolph G. Blaho, Franklin Park, Ill., assignors to Schwinn Bicycle Company, Chicago, Ill., a corporation of Illinois
Filed Mar. 26, 1968, Ser. No. 716,095
Int. Cl. B62j 9/00
U.S. Cl. 224—31          7 Claims

ABSTRACT OF THE DISCLOSURE

Detachable vinyl-coated wire basket mounted on a supporting frame on a tricycle, or the like, with handles attached for carrying the basket and including means for latching or locking the basket on the supporting frame in traveling position, the weight of the basket assisting to maintain the latching means in operative position.

BACKGROUND OF THE INVENTION

Field of the invention

The invention relates in general to load-carrying baskets mounted on cycles, and more particularly to such baskets that may readily be removed from traveling position thereon and carried manually, as into a house or store.

Description of the prior art

Heretofore, baskets of this type normally were either permanently attached to the cycle as a structural part thereof, such as on a work bicycle or a motorcycle, or temporarily attached to or mounted on the cycle, as to the handle bars by means of straps, or the like, for the sole purpose of carrying articles on the cycle.

SUMMARY OF THE INVENTION

This invention provides a load-carrying basket with handle means to facilitate manual carrying thereof, a cycle with a basket-supporting frame for carrying the basket in a traveling position, and latching means for retaining the basket in such traveling position on the cycle, the latching means being attached to and movable with the handle means relative to the frame, with the parts so dimensioned that movement of the latching means from operative or latching position to inoperative or release position requires lifting of the basket relative to the supporting frame, whereby the weight of the basket assists in retaining the latching means in operative position.

In the drawings:

FIG. 3 is a detail top plan view on an enlarged scale of one of the handle and latching means in operative position with the basket in traveling position;

FIG. 4 is a detail vertical section on the same scale as FIG. 3 through one of the handle and latching means showing the basket within its supporting frame and disposed slightly above traveling position;

FIG. 5 is a view similar to FIG. 4 showing the basket latched in traveling position.

DESCRIPTION OF THE PREFERRED EMBODIMENT

Figure 1:
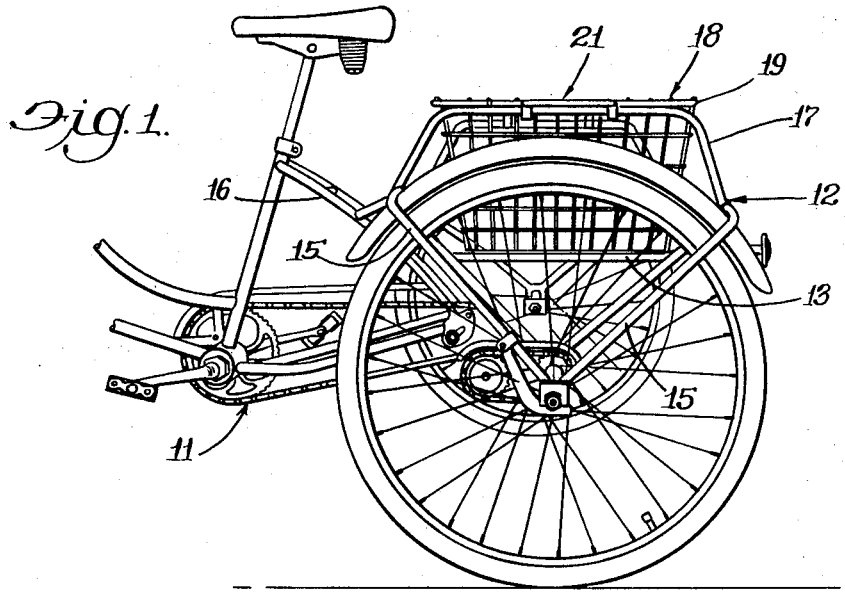
FIG. 1 is a side elevation of the rear portion of a cycle embodying the features of this invention with a detachable basket mounted in traveling position thereon.
Figure 2:
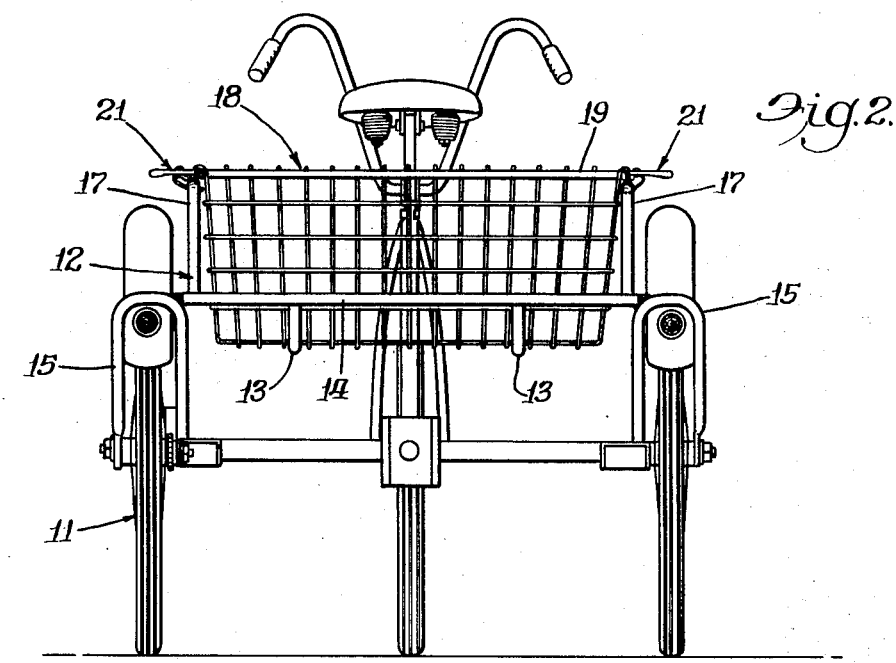
FIG. 2 is a rear elevational view as seen from the right side of FIG. 1.

Referring more particularly to FIGS. 1 and 2 of the drawings, a cycle indicated generally by reference numeral 11 of any desired construction is shown which is provided with a basket-supporting frame 12 having substantially U-shaped bottom members 13 (FIGS. 1 and 2) extending front-to-rear of the cycle and depending from transverse members 14 (FIG. 2) which preferably are supported at their outer ends by U-shaped brackets 15. The latter are mounted at their lower ends in well-known manner on the rear axle of the cycle, and the forward transverse members 14 is secured by a suitable bracket 16 (FIG. 1) to the cycle frame. This basket-supporting frame 12 also includes a pair of arms 17 slightly inwardly of the supporting brackets 15 and each having a central horizontal portion extending front-to-rear of the cycle terminating in downwardly extending portions secured at their ends by welding, or the like, to the adjacent transverse member 14.

A load-carrying basket indicated generally by reference numeral 18 is constructed in well-known manner from vinyl-coated metal wire, including an upper peripheral frame member 18, and so dimensioned relative to the frame 12 that it is supported in traveling position, as seen in FIGS. 1, 2 and 5, by the bottom members 13.

Means are provided to facilitate manual carrying of the basket 18 and movement thereof into and out of such traveling position which comprises a pair of handles 21 mounted on the side portions of the basket frame member 19. Each handle 21 preferably is U-shaped to provide a central hand-engageable portion with its ends flattened, as at 22 (FIGS. 3–5), and terminating in a curved portion 23 as basket-engaging means to receive or partially embrace the frame member 19.

Figure 6:
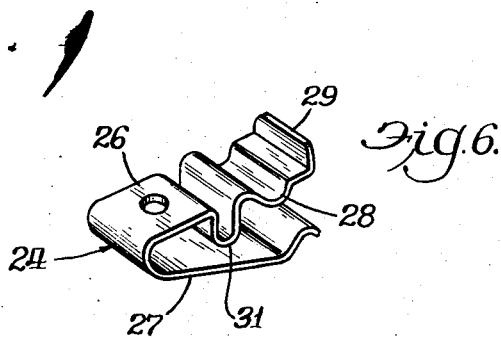
FIG. 6 is a perspective view of the latching means.

Means indicated generally by reference numeral 24 also are provided for latching or locking the basket 18 in traveling position on the frame 12. In this preferred embodiment, the latching means 24 comprises an open-ended spring clip, as best seen in FIG. 6, formed from a strip of suitable metal secured by a bolt and nut or other appropriate fastening means 25 (FIGS. 3–5) to each flattened portion 22 of each handle 21. Each clip 24 has a first leg 26 so secured to its handle 21 by the fastening means 25, and a second leg 27 reversely bent near its end and spaced therefrom a distance slightly less than the diameter of the arms 17 of the basket-supporting frame 12, as shown in FIG. 4. The end portion of the first leg 26 is formed to provide a curved section or recess 28 opposed to, and complementary with, the curved portion 23 of the associated handle when secured thereto, and terminates in an outwardly bent flange 29 overlying that end of the handle. Thus, when the clips 24 are secured as shown in FIGS. 3–5 on the handles 21, their first legs 26 and the curved portions 23 of the handles frictionally embrace the basket frame members 19 to pivotally attach the handle means 21 and latching means 24 to the basket 18. The first leg 26 of each latching means 24 preferably also is reversely bent intermediate its ends to provide stop means 31 for limiting outward and downward pivotal movement of the handle 21 to a substantially horizontal position by contacting the associated arm 17, as shown in FIG. 5, when the basket 18 is in traveling position on the frame 12.

In FIG. 4, the basket 18 is shown in the position which it assumes as it is being lowered into the supporting frame 12, the flanges 29 and the lower ends of the second leg 27 of the latching means 24 therein contacting the upper surface of the side arms 17 to limit further downward movement of the basket relative to its supporting frame. The handles 21 are then swung outwardly and downwardly about the centers of the associated side portion of the upper basket frame member 19 as pivot points to their position of FIG. 5. This is accompanied by a further downward movement of the basket 18 relative to its supporting frame 12 until the basket rests upon the bottom members 13, as shown in FIGS. 1 and 2, wherein the basket and its contents are supported by those bottom members 13. Such outward and downward movement of the handle means 21 also causes an initial spreading of the lower open end of the latching means 24 by virtue of a camming action by the adjacent portions of the frame arms 17 against the second leg 27, until the lower part of the reversely bent end portion of this leg 27 is passed inwardly beyond the vertical center line of the associated arm 17. The spring action of the clips then effects retention of the latching means 24 and handle means 21 in their operative position of FIG. 5. As previously noted, the stop 31 prevents further downward movement of the handle and latching means 21, 24 by contacting the outer surface of the associated frame arm 17. The basket 18 thus is latched or locked in its traveling position of FIGS. 1 and 2 on its supporting frame 12.

Whenever it is desired to detach the basket 18 from its supporting frame 12, it is necessary only to grap the handle means 21 and lift the basket out of the frame. Such lifting action will move the parts from their positions of FIG. 5 to those illustrated in FIG. 4, which releases the latching means 24 or moves the same to an inoperative position to permit removal of the basket from its supporting frame.

It will be appreciated that during such movement of the latching means from operative to inoperative position in the construction herein illustrated, it has been required to lift the basket from its lowermost traveling position of FIG. 5 to its slightly intermediate position of FIG. 4. Thus, the weight of the basket can be seen to materially assist in retaining the latching means 24 in its operative position of FIGS. 1, 2 and 5.

It also will be understood that while movements of the handles 21 and latching means 24 between raised or latch-released position and lowered or latched position, as in FIGS. 4 and 5, respectively, has been described as including vertical movement of the basket 18 relative to its supporting frame 12, such relative vertical movement may not occur if the parts are only slightly differently dimensioned, the relaxed position spacing between the open ends of clip legs 26 and 27 is somewhat greater than herein illustrated, or because relative lateral movements between the handle-supporting portions of the basket frame member 19 and the latch-engageable arms 17 of the basket-supporting frame 12 are permitted due to flexing of the parts or the nature of the materials employed. In this connection, it further will be appreciated that while the basket 18 has been indicated as being made from vinyl-coated wire, any other suitable material and specific construction may be employed. And it is not essential that the basket-supporting frame 12 include the illustrated bottom members 13, since the basket may be supported from any other suitable part of the frame, such as the arms 17. In fact, it is contemplated that the basket-supporting frame may be mounted elsewhere on the cycle than as shown, as above the front wheel, and that the term "cycle" as used herein should be construed as including other transport means, such as carts, as well as various types of cycles.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described and shown in the drawings being merely a preferred embodiment theeof.

We claim:

1. In a cycle having a basket-supporting frame, a detachable basket supportable in traveling position by said frame, handle means mounted on said basket for carrying the same manually, and separate latching means mounted on said handle means and movable therewith relative to said basket to engage the underside of said frame and grasp the same to latch said basket thereto when in traveling position, wherein said basket-supporting frame comprises bottom members for supporting said basket in traveling position and arms disposed above said bottom members for engagement by latching means.

2. The combination of claim 1, wherein said basket frame, handle and latching means are so dimensioned that movement of said latching means from operative to inoperative position to disengage the same from said arms requires lifting of said basket relative to said frame, whereby the weight of said basket assists in retaining said latching means in operative position.

3. The combination of claim 2, wherein said handle means and said latching means are secured together to effect disengagement of said latching means and movement thereof to inoperative position in response to lifting of said basket by said handles.

4. The combination of claim 1, wherein said handle means comprises a hand-engageable portion and basket-engaging means, and said latching means comprises an open-ended clip having a first leg secured to said basket-engaging means and a second leg spaced therefrom for engagement with the associated said arm.

5. The combination of claim 4, wherein said clip comprises a spring and said first leg thereof cooperates with said basket-engaging means to pivotally support said handle and latching means on said basket.

6. The combination of claim 5, wherein said handle means is substantially vertically disposed when said latching means is inoperative, stop means for limiting outward and downward movement of said handle means to a substantially horizontal position.

7. The combination of claim 6, wherein said stop means is formed integrally with said first leg of said latching means.

References Cited

UNITED STATES PATENTS

| 600,238 | 3/1898 | Sheppard | 224—31 |
| 672,540 | 4/1901 | Speir | 224—42 XR |
| 2,518,537 | 8/1950 | Frenchik | 224—32 XR |
| 3,039,663 | 6/1962 | Glenny | 224—32 |

FOREIGN PATENTS

| 66,481 | 3/1948 | Denmark. |
| 83,325 | 3/1954 | Norway. |

GERALD M. FORLENZA, Primary Examiner

F. E. WERNER, Assistant Examiner

U.S. Cl. X.R.

224—32